United States Patent [19]
Leon et al.

[11] Patent Number: 5,346,413
[45] Date of Patent: Sep. 13, 1994

[54] SEALING ELECTRICAL CONTACT

[75] Inventors: Robert Leon, Miami; Christian Schneider, Ft. Lauderdale, both of Fla.

[73] Assignee: Motorola, Inc., Schaumburg, Ill.

[21] Appl. No.: 175,170

[22] Filed: Dec. 29, 1993

Related U.S. Application Data

[63] Continuation of Ser. No. 937,012, Aug. 31, 1992, abandoned.

[51] Int. Cl.$^5$ ............................................. H01R 13/41
[52] U.S. Cl. ..................................................... 439/733
[58] Field of Search ................... 439/492, 733, 83, 77

[56] References Cited

U.S. PATENT DOCUMENTS

| | | | |
|---|---|---|---|
| 3,897,131 | 7/1975 | Stauffer | 439/733 X |
| 5,006,073 | 4/1991 | Mennona, Jr. | |
| 5,158,479 | 10/1992 | Mouissie | 439/733 X |
| 5,238,431 | 8/1993 | Kreisinger | 439/733 |

FOREIGN PATENT DOCUMENTS 2185644  7/1987  United Kingdom ................. 439/560

*Primary Examiner*—Eugene F. Desmond
*Attorney, Agent, or Firm*—Kenneth M. Massaroni

[57] ABSTRACT

An electrical contact (10) for insertion into an opening (31) in a housing wall comprises a substantially solid conductive member (20) having a radius smaller than the opening in the housing wall, a pair of substantially planar contact surfaces (18 and 22) on opposing ends of the conductive member, and at least one barb (14 or 16) on the entire periphery of the solid conductive member located between the planar contact surfaces, wherein the barb has a larger radius than the opening in the housing wall.

2 Claims, 2 Drawing Sheets

SEALING ELECTRICAL CONTACT

This is a continuation of application Ser. No. 07/937,012, filed Aug. 31, 1992, and now abandoned.

TECHNICAL FIELD

This invention relates generally to electrical contacts in general and particularly to an electrical contact which provides retention and sealing.

BACKGROUND

Mounting electrical contacts into a housing wall is often desirable and provides ease of manufacture. For example, portable two-way radios typically include rechargeable battery packs that have both charger contacts and contacts for connection to a radio. Various approaches are used for mounting the contacts, such as ultrasonic welding of contact carriers or use of molded-in contacts. These contacts typically must also connect to circuitry within the battery package. One known approach uses rivets which are affixed to a flex circuit. Rivets, however, do not produce highly reliable electrical connections to flex circuits and require the ultrasonic welding or heat staking of the contact carrier to the housing wall. A solution to the problem above is described in U.S. Pat. No. 5,006,073 owned by the assignee of the present invention and hereby incorporated by reference. '073 teaches a contact that can be surface mounted to a flex circuit and snap fit into a housing opening. Although the contact of '073 solves many problems, it does not provide water sealing or environmental sealing for batteries and other products that require reliable submersibility and environmental sealing without the use of an additional gasket. Furthermore, contacts incorporating the invention of '073 are made of stamped-out sheet metal. If the contacts are exposed to rugged conditions, then the sheet metal may bend. Thus, a need exists for a contact assembly that provides all the benefits of '073 and further provides additional ruggedness and water and environmental sealing without the use of gaskets.

SUMMARY OF THE INVENTION

An electrical contact for insertion into an opening in a housing wall comprises a substantially solid conductive member having a radius smaller than the opening in the housing wall, a pair of substantially planar contact surfaces on opposing ends of the conductive member, and at least one barb on the entire periphery of the solid conductive member located between the planar contact surfaces, wherein the barb has a larger radius than the opening in the housing wall.

DETAILED DESCRIPTION OF THE PREFERRED EMBODIMENT

Figure 1:
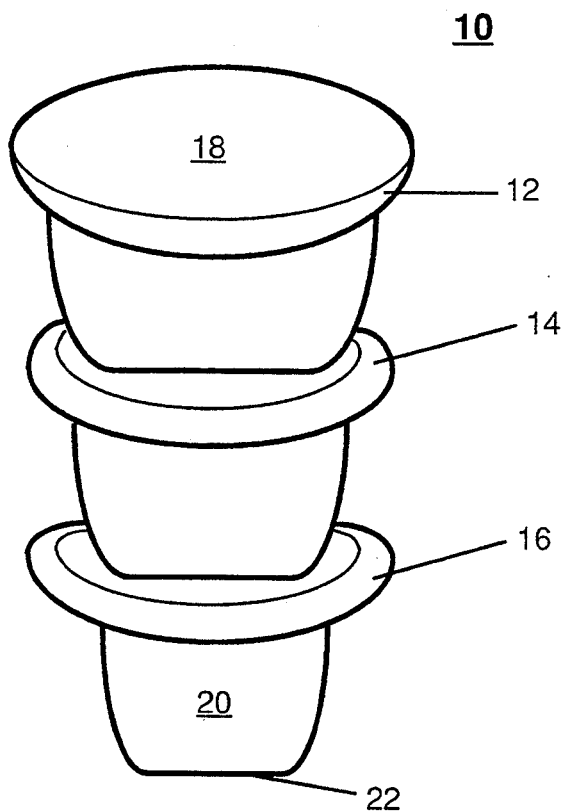
FIG. 1 is a perspective view of an electronic contact in accordance with the present invention.
Figure 2:
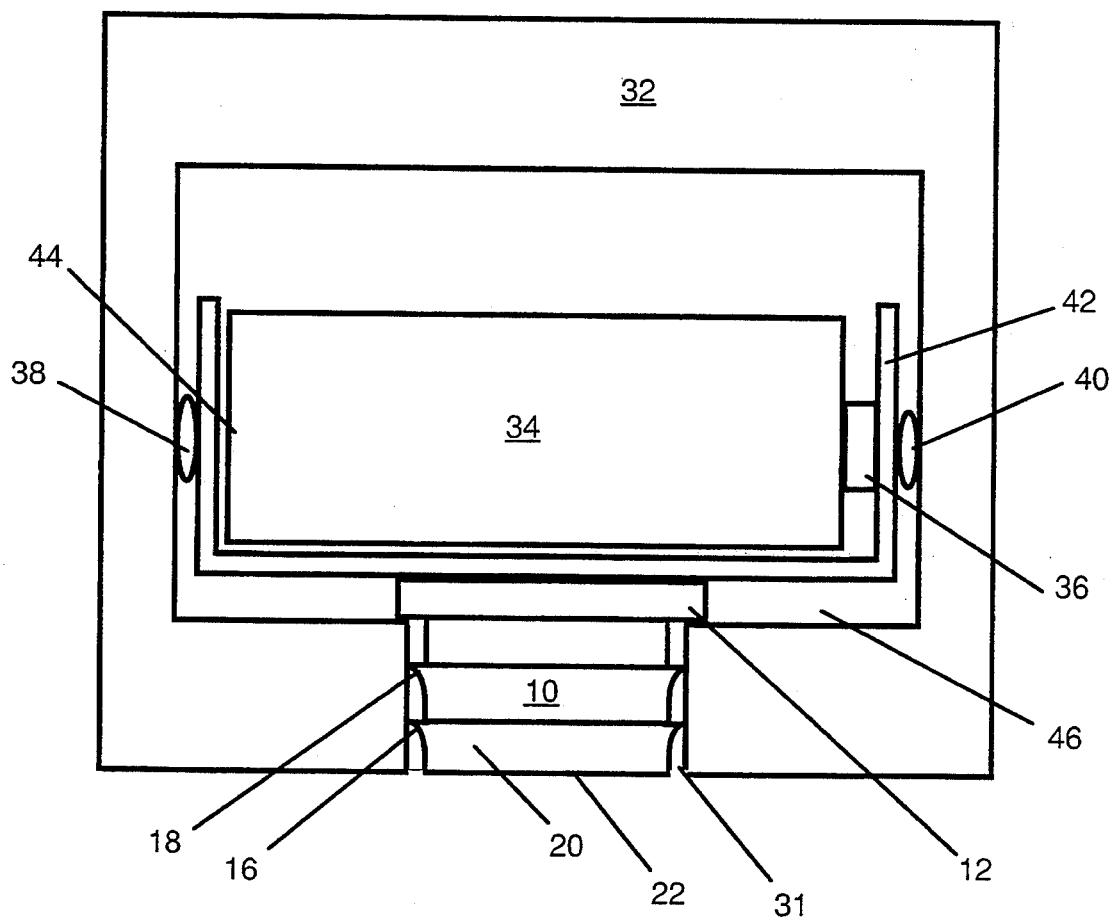
FIG. 2 is a side view of an electronic product using an electronic contact in accordance with the present invention.

Referring to FIG. 2, there is shown an electronic device 30 in accordance with the present invention. The electronic device comprises a housing wall 32 having an opening 31, wherein an electrical contact 10 (shown in FIG. 1 and 2) is inserted. The contact 10 preferably comprises a substantially solid conductive member 20 having either a smaller radius than opening 31 or a slightly tapering overall shape. The solid conductive member could also be substantially cylindrically shaped. Other shapes are contemplated within the confines of the present invention.

Figure 5:
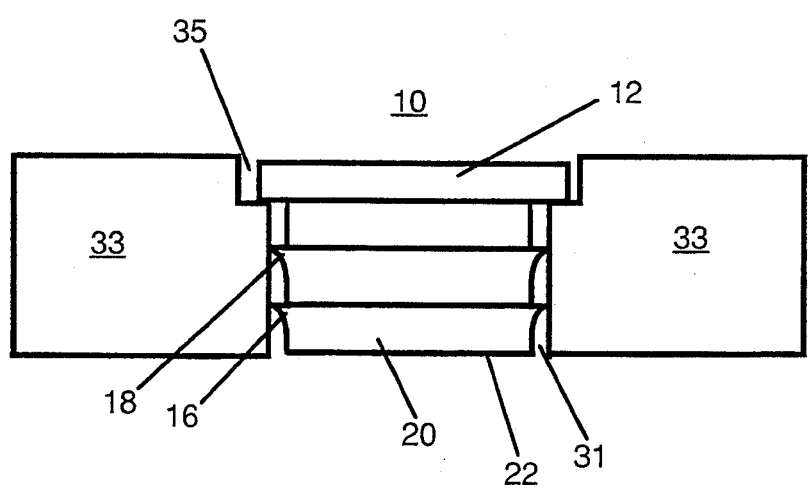
FIG. 5 is a side view of an electronic contact in an alternative housing in accordance with the present invention.
Figure 3:
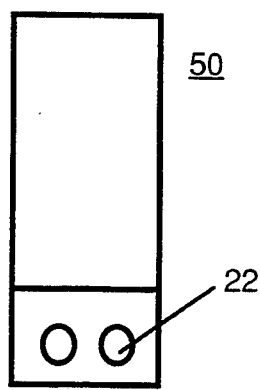
FIG. 3 is a back view of a radio using an electronic contact in accordance with the present invention.
Figure 4:
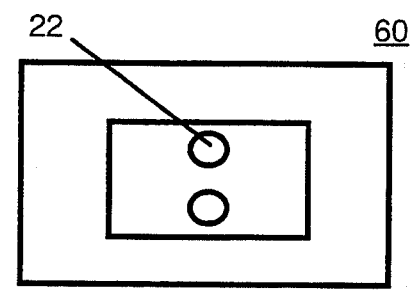
FIG. 4 is a top view of a battery charger using an electronic contact in accordance with the present invention.

The solid conductive member is preferably made of a metal such as brass or copper and further comprises at least one barb 14 on the entire periphery of the metal member. Other conductive materials such as conductive rubber can be used as well. Again, the solid metal member 20 preferably has a radius smaller than the radius of the opening 31. The barb 14 and any other additional barbs (16) preferably provide water sealing and environmental sealing when the contact 10 is wedged into the walls of the opening 31 since the barbs (14 and 16) have radii larger than the radius of the opening. The contact 10 is preferably made by machining the part in a lathe, similar to the manufacture of machine screws. It is understood that it is within contemplation of the present invention that any number of barbs or bands of barbs circumscribing the periphery of the member 20 can be used. Additionally, the contact preferably comprises a pair of substantially planar contact surfaces on opposing ends of the metal member. A first planar surface 22 preferably serves as a contact to either power another electronic device or to receive power from a battery pack. In other words, the contact 10 can be used in any electronic device such as a radio 50 (see FIG. 3), a battery pack 30 (See FIG. 2) or a battery charger 60 (see FIG. 4). The second planar contact surface 18 couples to electrical connection means 42 which provides electrical interconnection for the device 30. Preferably, the electrical connection means comprises a flex circuit 42. Optionally, the contact 10 further comprises a head 12 having a radius larger than the member 20 and the opening 31. Thus, providing a mechanical stop during insertion of the contact 10 into the opening 31. The head 12 rests on a ledge external to the opening, but inside the housing as shown in FIG. 2. Alternatively, the contact 10 inserts into a housing 33 shown in FIG. 5 having a recessed area 35 within the opening 31. Consequently, the head 12 would rest upon a shoulder or ledge formed in the recessed area 35. Likewise, this provides a mechanical stop and a flush mounted contact if desired.

If the device 30 is a battery pack, then the contact 10 couples to the flex circuit 42 via the contact surface 18. The flex circuit 42 in turn interconnects the negative (44) and positive (36) terminals of at least one battery cell 34. The device 30 should further include spring means 38 and 40 to bias the flex circuit 42 towards the cell terminals (44 and 36).

The contact 10 shown in FIGS. 1 and 2 in accordance with the present invention eliminates several problems found in existing contacts and provides additional benefits. The contact 10 allows for the elimination of extra seals or gaskets typically used in conjunction with electronic contacts. Here, since the bands of barbs (16 and 18) encircles the periphery of the contact member 20 and wedges into the side walls of the opening 31, no further sealing is required where sealing was previously found in area 46. Additionally, since the contacts are solid and not made of sheet metal, they are less likely to dent in or wear out.

What is claimed is:

1. An electronic device having electrical contacts for insertion into a housing wall of the electronic device, said electrical contact comprising:

a substantially solid conductive member having a radius less than the opening in the housing wall;

a pair of substantially planar contact surfaces disposed on opposing ends of the conductive member, said contact surfaces further comprising:

an electrical connection means, including a flex circuit, and wherein at least one contact surface is mounted so as to be substantially flush with an outside surface of the housing wall;

at least two barbs disposed concentrically about the periphery of the conductive member, and between said planar contact surfaces, wherein the barbs have a larger radius than the opening of the housing wall, said barbs wedging into the housing wall, providing an environmental seal; and a head region disposed about one of said substantially planar contact surfaces having a circumference larger than the contact, and the opening in said housing wall.

2. An electronic device as in claim 1, wherein the head mounts in a recessed area on the inner portion of the housing.

* * * * *